Oct. 22, 1957  R. C. PAULSEN  2,810,520
APPARATUS FOR MEASURING SHAFT ROTATION
Filed Dec. 22, 1953  4 Sheets-Sheet 1

FIG. 1.

INVENTOR.
ROBERT C. PAULSEN
BY
Campbell, Brumbaugh, Free & Graves
his ATTORNEYS

Oct. 22, 1957  R. C. PAULSEN  2,810,520
APPARATUS FOR MEASURING SHAFT ROTATION
Filed Dec. 22, 1953  4 Sheets-Sheet 2

FIG. 2.

INVENTOR.
ROBERT C. PAULSEN
BY Campbell, Brumbaugh,
Free + Graves
his ATTORNEYS

FIG. 3.

INVENTOR.
ROBERT C. PAULSEN
BY Campbell, Brumbaugh, Free & Graves
his ATTORNEYS

United States Patent Office 2,810,520
Patented Oct. 22, 1957

2,810,520

APPARATUS FOR MEASURING SHAFT ROTATION

Robert C. Paulsen, Boonton, N. J., assignor to International Business Machines Corporation, New York, N. Y., a corporation of New York Application December 22, 1953, Serial No. 399,776

13 Claims. (Cl. 235—92)

This invention relates to apparatus for measuring shaft rotation, and has particular reference to the measurement of the number of complete and fractional revolutions of a shaft rotating in either direction from a reference position.

It has been found necessary in numerous instances to determine quickly and accurately the number of complete and fractional revolutions made by a shaft rotating either forwardly or reversely. When high shaft speeds are encountered, it is particularly desirable to utilize an electronic counter to obtain such information, and the operation of such a counter from a shaft preferably requires a non-mechanical linkage therebetween. Such non-mechanical linkage must actuate the electronic counter in the same positive manner that is provided by a shaft directly connected to a mechanical counter. Thus, the electronic counter must at all times accurately register the number of complete and partial shaft revolutions to the smallest increment chosen and must be capable of forward or reverse operation from extremely slow shaft rotation to a high speed rotation.

Accordingly, it is a primary object of the present invention to measure by means of an electronic counter the number of complete and fractional revolutions made by a shaft rotating either forwardly or reversely.

It is another object of the invention to measure by means of an electronic counter the number of complete and fractional revolutions of a shaft forwardly or reversely irrespective of the speed of rotation of the shaft over a wide range.

It is a further object of the invention to register on an electronic counter in digital form the number of complete and fractional revolutions of a shaft forwardly or reversely.

It is still a further object of the invention to measure by means of an electronic counter the number of complete and fractional revolutions of a shaft forwardly or reversely and to read information out of the counter without interrupting the operation thereof.

These and further objects of the invention are accomplished by providing a plurality of signal generating means cooperating with means coupled to a rotatable shaft for producing signals as the shaft rotates to and through various positions. Pulse generating means are energized by such signals and cooperate with a fractions order counter for removing information therefrom and registering further information therein. As the shaft rotates through a referentially positioned arc and, in a sequence dependent upon the direction of rotation of the shaft, energizes and deenergizes indicating circuits in the first and last stages of the fractions order counter, means associated with the fractions order counter generate a forward carry or a reverse carry pulse which controls gating means associated with each order counter. When energized, indicating circuits in the first and last stages of the order counters produce forward and reverse pulses, respectively. Therefore, if the shaft has rotated through the referentially positioned arc, the forward or reverse pulses produced by the fractions order counter will be coupled through the associated gating means to a units order counter which, upon reaching the count of nine, generates a forward pulse upon the reception of one of the forward pulses from the fractions order counter and upon reaching the count of zero, generates a reverse pulse upon the reception of one of the reverse pulses from the fractions order counter.

A tens order counter, similar to the units order counter, may be disposed to receive through the gating means forward and reverse pulses from the units order counter and in a similar fashion generate forward and reverse pulses for utilization in a hundreds order counter. It is apparent that further order counters functioning in the above-described manner may, if desired, be added to the electronic counter.

Reading out means associated with each of the order counters may be selectively actuated to obtain the information stored therein without interrupting the functioning of the counters. In order to preclude reading information out of the order counters during a carrying operation, bias means are operative during generation of the forward and reverse carry pulses to prevent operation of the reading out means. Resetting means are also provided to selectively reset the order counters to a reference count.

These and further objects and advantages of the invention will be more readily understood when the following description is read in connection with the accompanying drawings in which.

In describing the present invention, reference will first be made to the block diagram of Figure 1 and a portion of Figure 2 in order to set forth certain general principles governing the measuring apparatus. Subsequently, the detailed operation of the invention will be explained with reference to the circuit diagrams found in Figures 2, 3 and 4 and with further reference to the timing diagrams shown in Figures 5 and 6.

Figure 2:
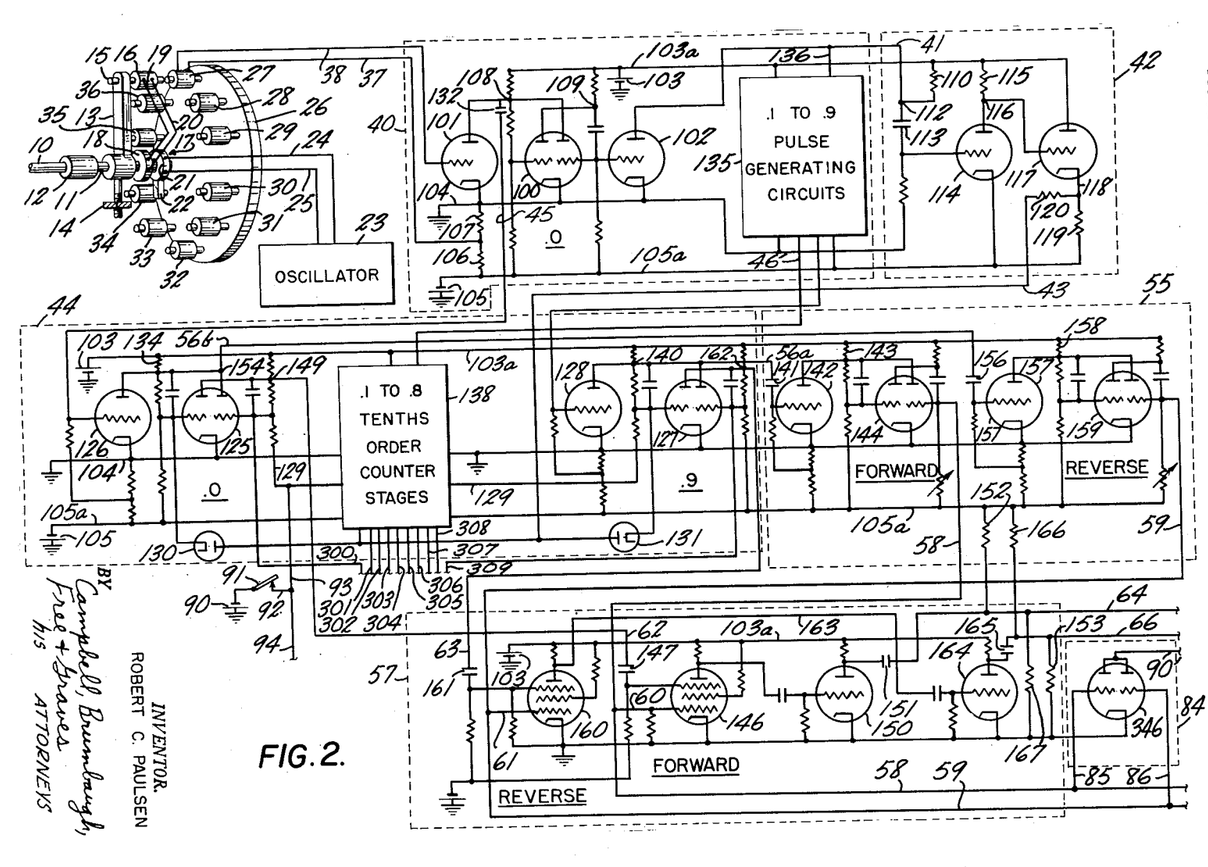
Figure 2 is a partial schematic circuit diagram of the block diagram shown in Figure 1.

Referring first to Figure 2, a shaft 10, adapted to be rotated intermittently or continuously in either direction, is connected to a rod 11 by a flexible coupling sleeve 12, such sleeve preferably being formed from resilient material. However, if desired the sleeve 12 may take the form of a rigid collar with, for example, set screws for joining it to the shaft 10 and the rod 11. Also joined to the rod 11 is an arm unit 13, provided with a counterbalance weight assembly 14 for dynamically balancing the rod 11, and fastened to the end of the arm 13 is a permanent magnet core 15 carrying a coil 16.

The rod 11 consists of magnetic material and is employed as a core for a transformer 17. Mechanically joined to the rod 11 is a secondary winding 18 of the transformer 17 electrically joined by conductors 19 and 20 to the coil 16. A primary winding 21 of the transformer 17 is mounted concentric with but not engaging the rod 11 by a supporting member 22, in turn joined to suitably supporting structure not shown. The transformer 17 is energized by a conventional oscillator 23 connected to the primary winding 21 by conductors 24 and 25.

In this illustrative embodiment of the invention, the assumption is being made that a tenth of a revolution of the shaft 10 is the smallest fraction or increment of rotation it is necessary to measure. It will be understood that any smaller or larger fractions or increments of shaft displacement may be employed depending upon the accuracy required in determining the final shaft position.

Thus, mounted on a supporting member 26, illustrated as a circular plate but which may be of any other convenient configuration, are ten magnetic core and pick-up coil assemblies 27 to 36, inclusive. Conductors 37 and 38 join the coil 27 to circuitry explained in detail hereinafter, and other conductors, not shown for clarity, connect the remaining coils 28 to 36, inclusive, to similar circuitry.

As mentioned above, the present invention must determine the position of the shaft 10 without regard to its speed of rotation. It will be apparent that with the shaft rotating at rates near zero speed, the voltage induced in the pick-up coils 27 to 36 as a result of the permanent magnet core 15 will be negligible and insufficient for control purposes. However, the relatively high frequency A.-C. voltage applied from the oscillator 23 through the conductors 24 and 25, the transformer 17 and the conductors 19 and 20 to the coil 16 sufficiently modulates the flux of the permanent magnet core 15 to insure the generation of signals in the pick-up coils 27 to 36, even though there is little or no motion of the shaft 10. As the shaft speed increases, fewer cycles of the high frequency modulating voltage will appear in the signals generated in the pick-up coils 27 to 36 until, at very high speeds, signals will be generated therein as a result of the flux from the permanent magnet core 15 alone.

It will be evident that as the shaft 10 is rotated, signals will be induced in the pick-up coils 27 to 36 past which the core 15 and the coil 16 sweep or which are in alignment therewith as the shaft 10 stops. However, if the core 15 stops or moves slowly between any of the coils 27 to 36, there will be a lack of induced pulses in the pick-up coils 27 to 36, the apparatus being designed so that substantially accurate alignment between the core 15 and coils 27 to 36 is necessary before signals are induced therein.

Figure 1:
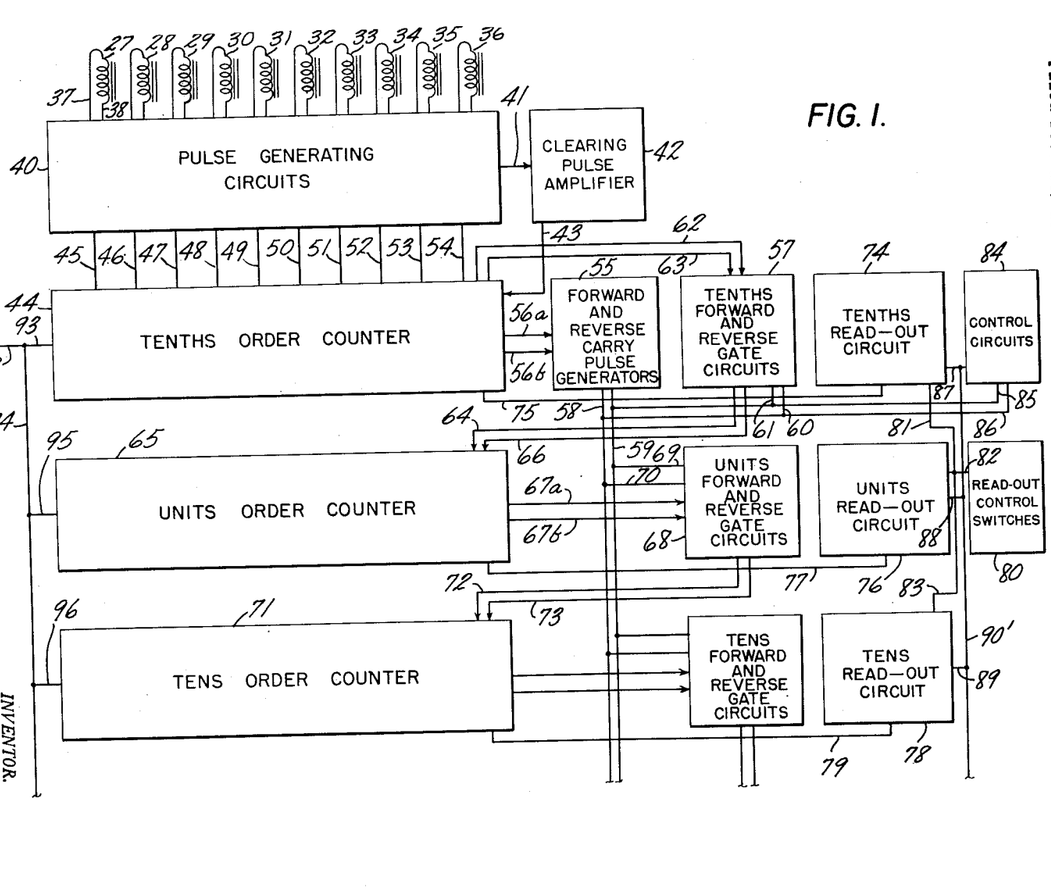
Figure 1 is a schematic circuit diagram in block form of shaft rotation measuring apparatus constructed in accordance with the invention.

Referring to Figure 1, the coils 27 to 36, inclusive, are shown connected to pulse generating circuits 40. As will be shown in detail hereinafter, each of the pick-up coils 27 to 36 is associated with a separate pulse generator which, when excited by signals induced in one of the coils 27 to 36 will generate a pair of pulses separated by a time interval determined by the time constants of the pulse generating circuits. For example, ten self-restoring trigger circuits such as monostable multivibrators may be employed in the circuits 40.

The initial pulse generated by one of the pulse generating circuits 40 in response to a voltage pulse from one of the coils 27 to 36 is coupled through a conduit 41, a clearing pulse amplifier 42 and a further conduit 43 to a tenths order counter 44 including ten trigger circuits representing the counts .0 to .9. Each of the circuits in the counter 44 is associated with one of the pulse generating circuits 40 through conductors 45 and 54, inclusive. For example, the trigger circuits in the tenths order counter 44 may each include a bistable multivibrator controlled by pulses from the clearing pulse amplifier 42 and the pulse generating circuits 40. Thus, the clearing pulse received by the tenths order counter 44 through the conduit 43 clears all information therefrom while the pulses coupled from the pulse generating circuits 40 through the conductors 45 to 54 switches one of the circuits in the tenths order counter 44 on thereby indicating the position of the shaft 10.

If the coil 36 represents the .9 position and the coil 27 the .0 position of the shaft 10, it will be apparent that as the core 15 advances from the coil 36 into alignment with or past the coil 27, a new revolution of the shaft 10 is being initiated. Since the tenths order counter 44 indicates only the fractions of one revolution, provision must be made to carry the count to a units order counter 65. Thus, when the permanent magnet core 15 moves from the coil 36 to or past the coil 27, forward and reverse carry pulse generators 55 will be energized through the conduit 56a to provide a forward carry pulse to open the forward gate in tenths forward and reverse gate circuits 57 through the conduits 58 and 60. Subsequently, a forward pulse produced by the tenths order counter 44 will be coupled through a conduit 62, the open forward gate in the forward and reverse gate circuits 57 and a conduit 64 to the units order counter 65.

On the other hand, when the shaft 10 rotates so that the core 15 induces signals in the coil 27 and subsequently in the coil 36, the forward and reverse carry pulse generators 55 are energized through a conduit 56b and a resultant reverse carry pulse is coupled through the conduits 59 and 61 to open the reverse gate in the tenths forward and reverse gate circuits 57. Subsequently, a reverse pulse generated by the tenths order counter 44 will be coupled through a conduit 63, the open reverse gate in the forward and reverse gate circuits 57 and a conduit 66 to the units order counter 65. For convenience, when rotation of the shaft 10 causes the core 15 to move through an arc defined by the pick-up coils 27 and 36, it will be stated that the shaft 10 has rotated through a referentially positioned arc.

The units order counter 65 is constructed to count up upon receiving a forward pulse and to count down upon receiving a reverse pulse. Furthermore, the units order counter 65 generates a forward pulse when going from 9 to 0, such forward pulse being applied through a conduit 67a to units forward and reverse gate circuits 68. If the forward gate in the forward and reverse gate circuits 68 has been opened by a forward carry pulse coupled thereto from the forward and reverse carry pulse generators 55 by the conduit 58 and a conduit 69, the forward pulse will pass through the units forward and reverse gate circuits 68 and be coupled to a tens order counter 71 through a conduit 72 to increase the count therein. Similarly, when reverse pulses are applied to the units order counter 65 and cause it to go from a 0 count to a 9 count, a reverse pulse will be coupled through the conduit 67b, the reverse gate in the units forward and reverse gate circuits 68 if it is open, and a conduit 73 to decrease the count in the tens order counter 71. The tens order counter 71 operates in the same manner as the units order counter 65 and has the same circuits associated therewith which will not be explained in detail. It is obvious that if desired, further order counters such as hundreds, thousands and ten thousands order counters may be provided to increase the counting range of the electronic counter.

Read-out circuits are associated with each of the order counters, tenths read-out circuits 74 being joined to the tenths order counter 44 by a conduit 75, units read-out circuits 76 being joined to the units order counter 65 by a conduit 77, and tens read-out circuits 78 being joined to the tens order counter 71 by a conduit 79. Read-out control switches 80 are connected to the read-out circuits 74, 76 and 78 by conduits 81, 82 and 83, respectively.

It is not desirable to read information out of the order counters when a count is being carried from one order to the next, and such a reading out operation at this time is prevented by control circuits 84 connected to the conduits 58 and 59 by conductor means 85 and 86. Thus, when either of the conduits 58 or 59 is energized, the control circuits 84 so bias the read-out circuits 74, 76 and 78 through conduits 87, 88 and 89, connected to a main conduit 90', that a read-out operation is precluded until after completion of the carry operation.

After a cycle of operation of the shaft 10, it may be desirable to reset the electronic counter to a reference count. This is accomplished by removing a negative bias normally supplied from a battery 90 through a switch 91, conduits 92, 93, 94, 95 and 96 to the order counters 44, 65, 71 and any further order counters that may be utilized. Such removal by opening the switch 91 causes the trigger circuits in the order counters to return to a desired status, as is explained hereinafter.

The above description has provided the general principles of operation of the present invention and indicated that the rotation of the shaft 10 in either direction may be measured by the information registered in an electronic counter. The details of the present invention will next be examined with particular reference to Figures 2 to 6, inclusive. The rotatable shaft 10 is positioned in Figure 2 so that the permanent magnet core 15 is aligned with the core of the coil 27. Accordingly, signals from the oscillator 23 will be applied through the conductors 24 and 25, the transformer 17, the conductors 19 and 20, the coil 16 and the coil 27 to the conductors 37 and 38 leading to the pulse generating circuits 40 shown in Figure 2 enclosed by broken lines. For simplicity, the remaining conductors leading from the coils 28 to 36 are not illustrated, and it will be understood that signals therefrom will be coupled to the circuits 40 in a similar manner. It will be evident that the rotation of the permanent magnet core 15 past the coil 27 will also generate signals therein by virtue of the magnetic flux cutting the conductors of the coil 27.

Found in the pulse generating circuits 40 are ten conventional self-restoring trigger circuits shown herein as monostable multivibrators, each circuit including a keying triode and an amplifying triode. For simplicity, only one self-restoring trigger circuit including a plate to grid coupled multivibrator 100 together with its associated keying triode 101 and amplifying triode 102 is shown, this trigger circuit being referred to as the .0 circuit since it is energized by the .0 coil 27. Each of these circuits is conventionally connected by a conductor 103a to a positive source 103, to a ground bus 104 and by a conductor 105a to a negative source 105. Throughout the following description of the remaining circuits in this embodiment of the invention, the same reference characters will designate the positive and negative sources and the ground bus.

When the shaft 10 is positioned at or passing through its zero position as shown in Figure 2, the core 15 will be in alignment with the core of the coil 27. Since one terminal of the coil 27 is joined by a conductor 38 to the control grid of the triode 101 and the other terminal is connected to the junction of a pair of cathode resistors 106 and 107, the triode 101 will conduct when the positive portions of the A.-C. voltage appear at the terminals of the coil 27. Such conduction lowers the potential at the junction 108 connected to the plate of the triode 101 causing the trigger 100 to switch on, i. e., the right hand section will become conductive. For convenience in this description, the off condition of a trigger circuit will refer to conduction of the left hand triode and the on condition to conduction of the right hand triode.

When the self-restoring trigger 100 is switched on, its junction 109 rises in potential and causes the normally cut-off triode 102 to become conductive. The resultant current flow from the positive conductor 103a through a resistor 110 and the conductor 41 leading to the clearing pulse amplifier 42 increases the voltage drop across the resistor 110 and causes the potential at a junction 112 to decrease, this negative pulse being applied through a condenser 113 to the grid of a normally conducting triode 114 which is, accordingly, rendered momentarily less conductive. The decreased current through a plate resistor 115 causes a junction 116, tied to the control grid of a triode 117 connected as a cathode follower, to increase in potential. Due to its connection through a resistor 119 to the negative conductor 105a, the cathode 118 of the triode 117 is normally substantially lower in potential than the ground bus 104. However, the receipt of the positive pulse on the grid of the triode 117 causes the cathode 118 to momentarily switch above ground, and the resulting positive clearing pulse is coupled through a resistor 120 and the conductor 43 to the tenths order counter 44.

Examining the tenths order counter 44 in greater detail, it consists of ten trigger circuits such as conventional bistable multivibrators, each being associated with a keying triode. For simplicity, two stages are illustrated in Figure 2 representing .0 and .9 in the tenths order counter 44. The .0 stage includes a conventionally connected plate to grid coupled bistable multivibrator 125 and a keying triode 126 while the .9 stage includes a similar multivibrator 127 and a keying triode 128. It will be understood that other types of trigger circuits may be employed in the order counter 44 and in the remaining order counters.

Before initiating a counting cycle, it is usually desirable to reset the order counters and this may be accomplished by opening the switch 91 to remove the negative bias from certain grids of the ten triggers including the triggers 125 and 127 in the tenths order counter 44. The conductor 93 is connected through a conductor 129 to the grid of the right hand section of the trigger circuit 125 and to the left hand grids of the remaining trigger circuits including the multivibrator 127. Thus opening the switch 91 will result in the .0 stage being switched on and the remaining stages being switched off in the tenths order counter 44. It will be apparent that similar switching will occur in the remaining order counters including the units order counter 65 and the tens order counter 71 upon opening the switch 91.

The positive clearing pulse on the conductor 43, generated as one of the self-restoring trigger circuits in the pulse generating circuits 40 is switched on, is applied to the plates of diodes associated with each of the stages in the tenths order counter 44, a diode 130 being connected to the grid of the left hand section of the multivibrator 125. Since the assumption has been made that operation of the measuring apparatus is being initiated, the multivibrator 125 will be on as a result of the functioning of the reset switch 91. This condition places the left hand grid of the multivibrator 125 at a relatively low potential so that the positive pulse on the conductor 43 when applied to the plate of the diode 130 will cause conduction thereof raising the left hand grid potential and causing the trigger circuit 125 to switch off.

It will be appreciated that the switching off of the .0 trigger circuit 125 in the tenths order counter 44 occurred as a direct result of the switching on of the self-restoring trigger 100 by the signals induced in the pick-up coil 27. Accordingly, at this instant all of the triggers in the tenths order counter 44 are off. After a short interval, the self-restoring trigger 100 switches to the off status, and the resulting positive pulse at the junction 108 is applied through a condenser 132 and the conductor 45 to the grid of the normally non-conductive keying triode 126. The resulting conduction of the triode 126 through a plate resistor 134 decreases the potential of the left hand grid of the trigger 125 causing it to switch to the on status. As long as the shaft 10 remains in this position, the .0 trigger in the tenths order counter 44 will be continuously switched off and on at a rate determined by the time constant of the self-restoring trigger 100.

If the shaft 10 is next rotated so that the core 15 coincides with or sweeps past the core of the coil 28, the signals induced therein will be coupled through conductors (not shown) to the .1 self-restoring trigger in .1 to .9 pulse generating circuits 135. As explained above in connection with the .0 self-restoring trigger, the signals from the coil 28 turn the .1 trigger on and the resultant pulse will cause conduction in the resistor 110 through the conductor 41 and a conductor 136. The resultant clearing pulse at the junction 112 is coupled through the triodes 114 and 117, the resistor 120 and the conductor 43 to the diodes associated with the tenths order triggers. Since the .0 trigger 125 is on, the diode 130 will conduct and switch it off. After a time interval, the .1 self-restoring trigger will switch off and the resulting positive pulse will be coupled through the conductor 46 in a conduit 46′, also containing the conductors 47 to 54, and leading from the .1 self-restoring trigger in the circuits 135 to the .1 keyer in .1 to .8 tenths order counter stages 138. This positive pulse will be effective to switch the .1 trigger on in a similar fashion to that described in connection with the .0 trigger above.

If the shaft 10 is subsequently moved so that the core 15 is positioned at a point between the coil 28 and the coil 29, the .1 trigger in the tenths order counter will remain on to indicate that the .1 pick-up coil 28 was last excited.

Accordingly, it is apparent that apparatus has been provided to indicate the position of the shaft 10 within a tenth of a revolution or 36°. Obviously, the invention is not limited to ten pick-up coils and associated self-restoring triggers but contemplates the use of as many or as few pick-up coils as may be necessary in any particular instance.

As pointed out above, the invention also provides an indication of the number of shaft revolutions in either direction. Thus, as the shaft 10 continues to rotate forwardly and passes the coil 36 associated with the .9 self-restoring trigger circuit, further rotation through the above-defined referentially positioned arc completing the revolution, causes the .0 self-restoring trigger 100 to switch on again. At this point, there must be some indication that one revolution has been completed and the circuits for accomplishing this function will next be described in detail.

When the .9 trigger 127 in the tenths order counter 44 is switched off by a positive pulse on the plate of the diode 131 as a result of the .0 self-restoring trigger 100 being switched on by signals from the coil 27, the potential at a junction 140 increases and is coupled through a condenser 141 to the control grid of a normally cut-off triode 142 in the forward and reverse carry pulse generators 55. Conduction of the triode 142 through a plate resistor 143 lowers the potential of the left hand grid of a forward self-restoring trigger 144, which may take the form of a conventional monostable multivibrator as illustrated in Figure 2, causing it to switch to the on status. The self-restoring trigger 144 is designed so that its on time is slightly longer than the on time of the .0 to .9 self-restoring triggers in the circuits 4.

The increase in potential at the right hand grid of the trigger 144, due to the switching to its on status, is coupled by the conductor 58 to the control grid of a pentode gate 146 in the tenths forward and reverse gate circuits 57, the suppressor grid of the pentode gate 146 being coupled by a condenser 147 and the conductor 62 to the right hand grid of the .0 trigger 125 in the tenths order counter 44. Normally, the suppressor and control grids of the pentode 146 are biased to prevent the flow of anode current so that both grids must be receiving signals simultaneously for anode current to flow. Therefore, since the increase in potential at the right hand grid of the self-restoring trigger 144 will be applied to the control grid of the pentode 146 for a longer interval than the on interval of the .0 self-restoring trigger circuit 100, as the .0 trigger circuit 125 is switched on by the self-restoring trigger circuit 100 switching off, the sharp rise in potential at a junction 149 in the trigger circuit 125 will be applied through the conductor 62 and the condenser 147 to the suppressor grid of the pentode gate 146, and plate current will momentarily flow therein. The resultant negative pulse will be inverted by a conventional triode amplifier 150 and applied as a positive pulse through a condenser 151 to the conductor 64 leading to the units order counter 65 as shown in Figure 1. Resistors 152 and 167 are connected from the conductor 64 to the negative conductor 105a and the ground bus 104, respectively, to form a voltage divider that establishes a negative potential on the conductor 64 with respect to ground for a purpose explained hereinafter.

Accordingly, when the shaft 10 advances the core 15 from the coil 36 to or past the coil 27, a forward carry pulse is applied to the conductor 58 and a forward pulse is applied to the conductor 64 leading to the units order counter 65. However, as mentioned above, the present invention contemplates measuring a shaft rotating in either direction. Thus, provision has been made to indicate movement of the core 15 by the shaft 10 from the coil 27 representing the reference or zero position to the coil 36 representing the .9 position. As the core 15 is aligned with or sweeps past the core of the coil 36, signals induced therein will be applied through conductors (not shown) to the .9 self-restoring trigger in the .1 to .9 pulse generating circuits 135. These signals will switch the .9 self-restoring trigger circuit on which will switch the .0 trigger circuit 125 off, as explained above, and the resultant positive pulse at a junction 154 will be coupled through the conductor 56b and a condenser 156 to the grid of a normally cut-off triode 157. As a result of this positive pulse, the triode 157 conducts through a resistor 158 causing a self-restoring trigger circuit 159, similar to the trigger circuit 144, to switch to the on status. As explained in connection with the trigger circuit 144, the on interval of the trigger circuit 159 is designed to be slightly longer than that of the self-restoring trigger circuits found in the pulse generating circuits 40.

The increase in potential at the right hand grid of the trigger circuit 159, termed a reverse carry pulse, is coupled by the conductors 59 and 61 to the control grid of a pentode gate 160 in the tenths forward and reverse gate circuits 57. The pentode 160 operates in a manner similar to that explained in connection with the pentode gate 146. Thus, the suppressor grid of the pentode 160 is connected through a condenser 161 and the conductor 63 to a junction 162, coupled to the right hand grid of the .9 trigger circuit 127 in the tenths order counter 44. Accordingly, as the trigger circuit 127 is switched on, a positive pulse is applied to the suppressor grid of the pentode gate 160 and since the control grid is receiving a reverse carry pulse, a negative pulse is applied to a conductor 163, inverted by a conventional triode amplifier 164 and applied as a reverse pulse through a condenser 165 to the conductor 66 leading to the units order counter 65. As explained in connection with the conductor 64, resistors 166 and 153 are connected from the conductor 66 to the bias conductor 105a and ground, respectively, to form a voltage divider establishing a negative potential on the conductor 66 with respect to ground.

Accordingly, when the shaft 10 causes the core 15 to travel in a reverse direction from the coil 27 to or past the coil 36, a reverse carry pulse is applied to the conductor 59 and a reverse pulse is applied to the conductor 66 leading to the units order counter 64.

Figure 3:
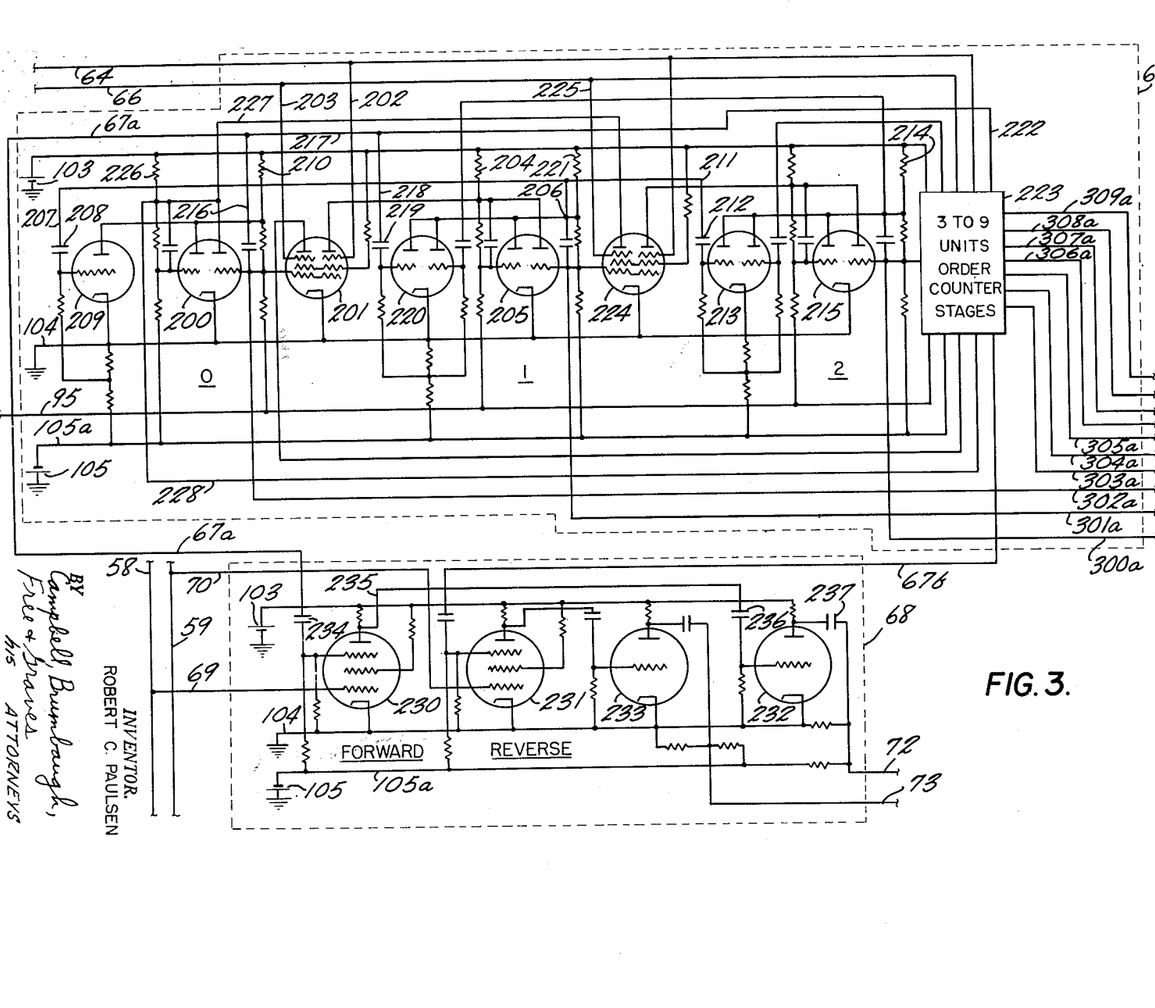
Figure 3 is a further partial schematic circuit diagram of the block diagram illustrated in Figure 1.

Examining the units order counter 65 with particular reference to Figure 3, the conductors 64 and 66 couple positive pulses termed forward and reverse pulses, respectively, indicative of a forward or a reverse revolution of the shaft 10 to the counter 65. The counter 65 is constructed, as will be explained in detail hereinafter, to count up or down one unit upon the receipt of one forward or one reverse positive pulse on the conductors 64 and 66, respectively. For example, upon the receipt by the counter 65 of a forward pulse on the conductor 64 when the 1 stage is on, the 2 stage will be switched on and the pulses generated by such switching will attempt to switch off both the 1 stage and the 3 stage. The receipt of a reverse pulse on the conductor 66 results in a similar sequence of events but with a count down of one unit.

In describing the units order counter 65 in detail, it will be assumed that the reset switch 91 has been operated to remove the negative bias from the conductor 95 so that the individual triggers in the order counter 64 have been switched off with the exception of the 0 stage which will be switched on, this action being similar to that described in connection with the tenths order counter 44. The 0 stage comprises a bistable trigger circuit shown herein as a conventionally connected bistable multivibrator 200 with its right hand grid connected to the control grids of a dual pentode gate 201. With the 0 stage on and the right hand grid high, the pentode gate 201 will be open but since the conductors 202 and 203 couple the negative bias found on the conductors 64 and 66, due to the voltage dividers 152, 153 and 166, 167, to the suppressor grids, the flow of plate current therein is precluded.

Assuming next the application of a forward positive pulse to the conductor 64, such pulse will be coupled through the conductor 202 to cause the right hand pentode of the gate 201 to conduct through a plate resistor 204 and decrease the potential on the left hand grid of a trigger circuit 205 in the 1 stage thereby switching it to the on status. This action raises the potential at a junction point 206, due to its connection to the right hand grid of the trigger 205, and the resulting positive pulse is coupled by a conductor 207 and a condenser 208 to the grid of a normally non-conductive triode 209. Therefore, plate current in the triode 209 will flow through a plate resistor 210 to switch the trigger 200 off due to the decrease in potential at its right hand grid.

The positive rise in potential at the point 206 as the trigger 205 is switched on is also coupled by a conductor 211 and a condenser 212 to the left hand grid of a normally non-conductive dual triode 213. The resulting current flow through a plate resistor 214, coupled at its low end to the right hand grid of a trigger 215 in the 2 stage, attempts to turn the trigger 215, now in the off status, off.

Accordingly, it is apparent that by turning the trigger 205 in the 1 stage on, an attempt is made to turn both the trigger 200 in the 0 stage and the trigger 215 in the 2 stage off. Similarly, if the trigger 200 in the 0 stage is turned on, an attempt will be made to switch the trigger 205 in the 1 stage off by coupling the positive rise in potential at the right hand grid of the trigger 200 through conductors 216, 217 and 218 and the condenser 219 to cause current flow through a normally non-conductive triode 220 and a plate resistor 221. The resultant decrease in potential at the right hand grid of the trigger 205 will attempt to switch it off. The same positive rise in potential will be coupled through the conductors 216 and 217 and a conductor 222 to the 9 stage, shown in block form with 3 to 9 units order counter stages 223. In the same manner described above, an attempt will be made to switch the 9 stage trigger off.

It should be noted that a dual pentode gate 224 cooperates with the trigger 205 in the same manner that the pentode gate 201 cooperates with the trigger 200. Thus, a reverse pulse on the conductor 66 will be coupled through a conductor 225 to the left hand suppressor grid and, assuming the 1 stage to be on, the pulse will cause current flow through a resistor 226, a conductor 227 and the left hand pentode of the gate 224 to switch the trigger 200 to the on status. Subsequently in a manner explained above, an attempt will be made to switch the 1 stage off through the conductors 216, 217 and 218 and to switch the 9 stage off through the conductors 216, 217 and 222.

In the event the tens order counter 71 (Figure 1) is employed, information must be coupled thereto when the units order counter 65 increases from 9 to 0 or decreases from 0 to 9. In order to provide such information, a forward pentode gate 230 and a reverse pentode gate 231 cooperate with triode inverters 232 and 233, respectively, in the units forward and reverse gate circuits 68. As shown in Figures 1 and 3, the conductors 58 and 59 are tied by the conductors 69 and 70 to the control grids of the forward pentode gate 230 and the reverse pentode gate 231, respectively, in the units forward and reverse gate circuits 68.

Assuming that the shaft 10 is advancing in its tenth revolution so that the core 15 passes out of alignment with the coil 36 and into alignment with the coil 27, the forward self-restoring trigger 144 (Figure 2) will be switched on and the resultant forward carry pulse will be coupled by the conductor 58 and the conductor 69 to the control grid of the gate 230. Accordingly, the pentode gate 230 will be open and as the units order counter 65 shifts from 9 to 0, a positive rise in potential at the right hand grid of the trigger 200 will be coupled through the conductors 216, 67a and a condenser 234 to the suppressor grid of the gate 230. Since the on time interval of the forward self-restoring trigger 144 is longer than that of the self-restoring trigger 100 (Figure 2), the gate 230 will be open and will conduct in response to the positive pulse on the suppressor grid. The resulting negative pulse will be coupled through a conductor 235, a condenser 236, inverted by the triode 232 and applied through a condenser 237 to the conductor 72 leading to the tens order counter 71, shown in Figure 1.

In similar fashion, when the shaft 10 moves the core 15 from the coil 27 to the coil 36, the resulting reverse carry pulse on the conductor 59 is applied through the conductor 70 to the reverse pentode gate 231 and if the 9 stage in the units order counter 65 is simultaneously switched on, a reverse pulse will be applied to the conductor 73 leading to the tens order counter 71.

Figure 5:
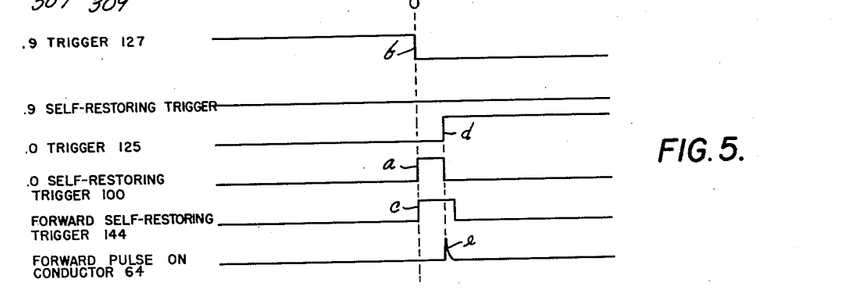
Figures 5 and 6 are timing diagrams helpful in explaining the operation of the embodiment of the invention shown in Figure 1.
Figure 6:
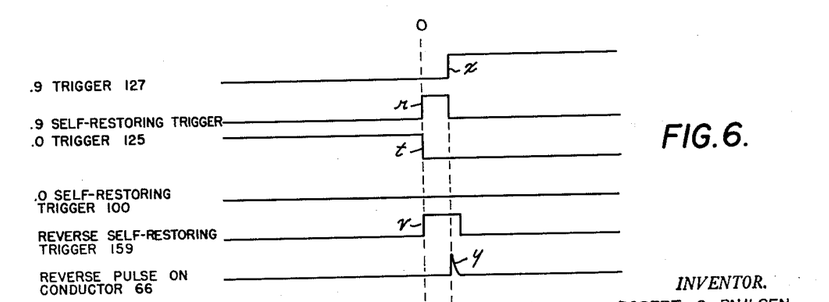

The timing diagrams illustrated in Figures 5 and 6 will be helpful in clarifying the operation of this embodiment of the invention when the shaft 10 moves from the .9 position to the .0 position or from the .0 position to the .9 position. Referring first to Figure 5, as the core 15 rotates into alignment with the coil 27 from the coil 36, the .0 self-restoring trigger 100 will be switched on at the reference time 0 as indicated by a pulse $a$. As explained heretofore, the switching on of the trigger 100 will switch the .9 trigger 127 off as shown at $b$. As a result of the trigger 127 switching off, the forward self-restoring trigger 144 will be switched on as indicated by the pulse $c$. The next occurrence involves the switching off of the trigger 100 at the trailing edge of the pulse $a$ which produces a pulse turning on the .0 trigger 125 at $d$. In switching on, the trigger 125 generates a pulse which is applied to the gate 146, open since the trigger 144 is on, to produce a forward pulse $e$ on the conductor 64 leading to the units order counter 65.

Referring next to Figure 6, as the core 15 moves into alignment with the coil 36 from the coil 27, the .9 self-restoring circuit in the circuits 135 will be switched on at the reference time 0 as indicated by the pulse $r$. As explained above, the switching on of the .9 trigger will switch the .0 trigger 125 off as shown at $t$. As a result of the trigger 125 switching off, the reverse self-restoring trigger 159 will be switched on as indicated by the pulse $v$. The next occurrence involves the switching off of the .9 self-restoring trigger at the trailing edge of the pulse $r$ which produces a pulse turning on the .9 trigger 127 at $x$. In switching on, the trigger 127 generates a pulse which is applied to the gate 160, open since the trigger 159 is on, to produce a pulse $y$ on the reverse carry conductor 66 leading to the units order counter 65.

As previously explained, during forward carrys out of the tenths order counter 44, the forward self-restoring trigger 144 is on and since the right hand grid is connected to the conductor 58, it will be high at this time. Accordingly, since the line 58 is connected to the pentode gate 146 in the tenths forward and reverse gate circuits 57 and to the corresponding gates in succeeding gate circuits, any order counter which advances from 9 to 0 will produce a forward pulse which will be applied to the next higher order. Likewise, when the reverse self-restoring trigger 159 is on indicating a reverse carry from the tenths order counter 44, the conductor 59 will be high in potential and connected to the control grids of each of the pentode gates corresponding to the pentode gate 160 in the tenths forward and reverse gate circuits 57. Therefore, any order going from 0 to 9 will generate a reverse pulse which will be applied to the next higher order.

In an exemplary operation of this embodiment of the invention, if the amount registered in the order counters is 19.9 and the shaft 10 advances one more increment to 20.0, a forward pulse will be coupled from the tenths order counter 44 through the conductor 62, the tenths forward and reverse gate circuits 57 and the conductor 64 to the units order counter 65. This will switch the 0 trigger 200 on and the sharp rise in potential at the right hand grid thereof will be coupled through the conductors 216 and 67a and the condenser 234 to the suppressor grid of the forward pentode gate 230 having its control grid connected by the conductor 69 to the now high conductor 58. Thus, this sharp rise in potential will be coupled through the triode inverter 232 and the conductor 72 to the tens order counter 71 so that almost simultaneously with the occurrence of the carry into the units order counter 65, a carry to the tens order counter 71 is produced, the only delay being introduced by the switching on of one of the units order triggers, which is in the order of several microseconds. In a similar fashion, if the count stands at 20 in the order counters and the shaft 10 is moved in the reverse direction one increment, a reverse pulse is coupled to the units order counter 65 which, in turn, produces a reverse pulse for the tens order counter 71. The tenths order counter 44 goes from .0 to .9, the units order counter 65 goes from 0 to 9 and the tens order counter 71 goes from 2 to 1, the end result being 19.9 in the electronic counter.

Figure 4:
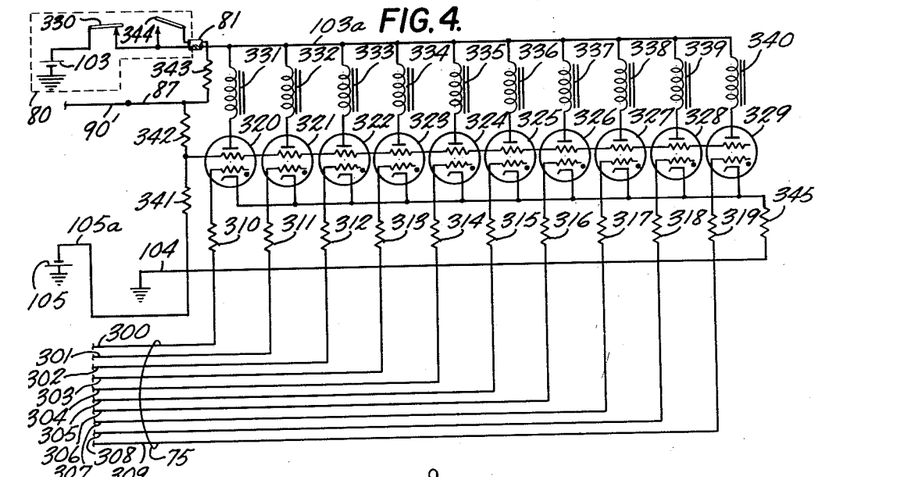
Figure 4 is still another partial schematic diagram of the block diagram shown in Figure 1.

The concern to this point has been to register the number of complete and fractional revolutions of the shaft 10 on the various order counters. In order for such information to be useful, read-out means must be provided to store the registered information at any convenient time without interrupting the operation of the counters. One suitable form of read-out means is illustrated in Figure 4 and will be described with reference thereto. These circuits provide for reading information out of one of the order counters so that three such read-out circuits, for example, would be utilized if tenths, tens and units order counters were employed in the invention.

Describing the function of the read-out circuit of Figure 4 in the storing of information found in the tenths order counter 44, conductors 300 to 309, inclusive, lead from the right hand grids of the .0 to .9 triggers through resistors 310 to 319, inclusive, to the control grids of thyratrons 320 to 329, inclusive. The plates of the thyratrons 320 to 329 are coupled to the source of positive potential 103 through a switch 330, the conductor 103a and relay coils 331 to 340, inclusive. The shield grids of the thyratrons 320 to 329 are tied together and connected through a resistor 341 to the conductor 105a, leading to the negative source of potential 105, and to a resistor 342 connected at its other end to the conductor 87 and a resistor 343, a switch 344 connecting the resistor 343 through the conduit 81 to the positive line 103a. The cathodes of the thyratrons 320 to 329 are connected through a resistor 345 to the ground bus 104.

In order to prevent reading information out of an order counter during a carry operation, a dual triode 346 (Figure 2) has its control grids connected by the conductors 85 and 86 to the conductors 58 and 59, respectively, while the plates thereof are joined and connected to the conductor 90', shown in Figures 1, 2 and 4.

Normally the switch 344 is in the position shown to provide a high negative potential on the shield grids of each of the thyratrons 320 to 329 to prevent firing thereof regardless of the potentials on their control grids. However, closing the switch 344 raises the potential of the shield grids a sufficient amount to fire any one of the thyratrons 320 to 329 having its control grid connected to an on trigger in the tenths order counter 44. Such firing of one of the thyratrons, assume it to be 320, will cause plate current to flow through the relay coil 331 and energize the associated relay armature (not shown) to indicate that the .0 stage of the tenths order counter 44 is on. When any thyratron 320 to 329 fires, the increased current flow through the cathode resistor 345 raises the cathode potential of the remaining thyratrons so that it is impossible for any one of them to fire. In order to extinguish the thyratron fired and restore the circuits, a momentary opening of the switch 330 is required to remove the anode potential from all of the thyratrons 320 to 329.

It will be understood that each of the order counters requires a circuit such as that shown in Figure 4 to read out information contained therein. Thus, conductors 300a to 309a, inclusive, lead from the right hand grids of the triggers in the units order counter 65 and are adapted to be joined to the control grids of read-out thyratrons. For simultaneously reading out from each of the order counters, the switches in the other read-out circuits corresponding to the switches 344 and 330 may be ganged therewith or such switches may be employed in one order only with appropriate interconnections being made to effect simultaneous read out and restoring in each order.

During normal operation of the invention, there is one trigger on in each of the order counters. However, during a carry operation there may be a slight overlap due to delays in trigger switching, and to delay the operation of the read-out circuits until such carrying operations are completed, the dual triode 346 described above as being connected to the conductors 58 and 59, is joined to the juncture of the resistors 342 and 343 by the conductors 87 and 90'. Thus, during a carry operation, either the forward self-restoring trigger 144 or the reverse self-restoring trigger 159 is on, and one of the conductors 58 and 59 will be high, causing conduction of the dual triode 346 through the resistor 343. Such current flow will prevent the junction of the resistors 342 and 343 from reaching the potential normally attained by closing the switch 344 and, accordingly, the shield grids of the thyratrons 320 to 329 will be prevented from rising to the potential necessary to permit one of the thyratrons to fire. Due to the connection of the conductor 90' by the conductor 88 to the units read-out circuit 76 and by the conductor 89 to the tens read-out circuit 78, neither of these circuits will read information out of their associated order counters during a carry operation.

It will be understood that the above-described embodiment of the invention is illustrative only and modifications thereof will occur to those skilled in the art. For example, photoelectric cells may be substituted for the pick-up coils 27 to 36, inclusive, and a flashing light may be provided in place of the core 15 and the coil 16 to produce the signals for controlling the electronic counter. Furthermore, other circuits utilizing, for example, vacuum tubes, may be employed for reading information out of the order counters. Therefore, the invention is not to be limited to the specific apparatus disclosed herein but is to be defined by the appended claims.

I claim:

1. In apparatus for measuring shaft rotation, a plurality of signal generating means each generating a distinct signal representative of one position of said shaft, means responsive to said signals for indicating the position of said shaft, means responsive to a pair of said distinct signals in one sequence generated during forward shaft rotation through a referentially positioned arc for generating a forward pulse, means responsive to the pair of said distinct signals in another sequence generated during reverse shaft rotation through said arc for generating a reverse pulse, and counting means responsive to said forward and reverse pulses for varying the count therein.

2. In apparatus for measuring shaft rotation, first means coupled to said shaft, said first means being moved along a closed path during each revolution of said shaft; a predetermined number of second means, pulse generating circuits and indicating circuits; said second means being spaced along the path, said first means cooperating with each of said second means when adjacent thereto for generating signals therein, each of said pulse generating circuits being coupled to an associated one of said second means and responsive to the signals therefrom for generating a pair of spaced pulses, a fractions order counter including said indicating circuits, each of said indicating circuits being associated with one of said pulse generating circuits, means responsive to the first of said pair of spaced pulses for clearing said indicating circuits in said fractions order counter, and means responsive to the second of said pair of spaced pulses for energizing the indicating circuit coupled to the pulse generating circuit producing said second pulse.

3. In apparatus for measuring shaft rotation, a coil assembly coupled to said shaft, said assembly adapted to be energized by an alternating current source and provided with a permanent magnet core, said assembly being rotated along a closed path during each revolution of said shaft; a predetermined number of pick-up coils, self-restoring trigger circuits and indicating circuits; said pick-up coils being symmetrically spaced along the path, said coil assembly cooperating with each of said pick-up coils when adjacent thereto for generating signals therein, each of said self-restoring trigger circuits being coupled to an associated one of said pick-up coils and responsive to the signals therefrom for generating a pair of spaced pulses, a fractions order counter including said indicating circuits, each of said indicating circuits being coupled to an associated one of said self-restoring trigger circuits and including a trigger circuit with stable on and off conditions, means responsive to the first of said pair of spaced pulses for switching off any of said trigger circuits in the on condition, and means responsive to the second of said pair of spaced pulses for turning on the trigger circuit in the indicating circuit coupled to the self-restoring trigger circuit producing said second pulse.

4. Apparatus for measuring shaft rotation comprising first means coupled to said shaft, said first means being moved along a closed path during each revolution of said shaft; a predetermined number of second means, pulse generating circuits and indicating circuits; said second means being spaced along the path, said first means cooperating with each of said second means when adjacent thereto for generating signals therein, each of said pulse generating circuits being coupled to an associated one of said second means and responsive to the signals therefrom for generating a pair of spaced pulses, a fractions order counter including said indicating circuits, each of said indicating circuits being coupled to an associated one of said pulse generating circuits, means responsive to the first of said pair of spaced pulses for clearing said indicating circuits in said fractions order counter, means responsive to the second of said pair of spaced pulses for energizing the indicating circuit coupled to the pulse generating circuit producing said second pulse, a units order counter, forward means responsive to energization of a predetermined pair of said indicating circuits in a first sequence for applying a forward pulse to said units order counter, reverse means responsive to energization of said predetermined pair of said indicating circuits in a second sequence for applying a reverse pulse to said units order counter, said units order counter being responsive to said forward pulses for counting up and being responsive to said reverse pulses for counting down.

5. Apparatus as defined in claim 4 in which means are provided for selectively reading the count out of said counters.

6. Apparatus for measuring shaft rotation comprising a plurality of signal generating means each generating a distinct signal representative of one position of said shaft, means including a fractions order counter responsive to said signals for indicating the position of said shaft, a plurality of order counters connected in cascade relation to said fractions order counter, forward means responsive to the operation of said fractions order counter upon forward shaft rotation through a referentially positioned arc for generating and coupling a forward pulse to the immediately succeeding order counter for increasing the count therein, and reverse means responsive to the operation of said fractions order counter upon reverse shaft rotation through said arc for generating and coupling a reverse pulse to the immediately succeeding order counter for decreasing the count therein, each of said plurality of cascaded order counters being conditioned by reaching a first predetermined count to be responsive to a forward pulse from the immediately preceding order counter for generating and coupling a forward pulse to the immediately succeeding order counter, each of said plurality of cascaded order counters being conditioned by reaching a second predetermined count to be responsive to a reverse pulse from a preceding order counter for generating and coupling a reverse pulse to a succeeding order counter.

7. In apparatus for measuring shaft rotation, a plurality of signal generating means each generating a distinct signal representative of one position of said shaft, means including a fractions order counter consisting of a like plurality of indicating circuits respectively responsive to said distinct signals for selectively energizing and deenergizing said circuits to indicate the position of said shaft, gating means coupling a further order counter to said fractions order counter, carry pulse generating means responsive to the deenergization of a first predetermined one of said indicating circuits for producing a carry pulse, means responsive to said carry pulse for opening said gating means, and means for coupling a pulse generated in response to energization of a second predetermined one of said indicating circuits to said gating means.

8. Apparatus for measuring shaft rotation comprising a plurality of signal generating means each generating a distinct signal representative of one position of said shaft, means including a fractions order counter consisting of a like plurality of indicating circuits respectively responsive to said distinct signals for selectively energizing and deenergizing said circuits to indicate the position of said shaft, fractions forward and reverse gating means coupling a units order counter to said fractions order counter, units forward and reverse gating means coupling a tens order counter to said units order counter, forward carry pulse generating means responsive to deenergization of a first predetermined one of said indicating circuits for producing a forward carry pulse, means responsive to said forward carry pulse for opening said fractions and units forward gating means, reverse carry pulse generating means responsive to deenergization of a second predetermined one of said indicating circuits for producing a reverse carry pulse, means responsive to said reverse carry pulse for opening said fractions and units reverse gating means, means for coupling a fractions forward pulse generated in response to energization of said second predetermined indicating circuit to said fractions forward gating means, means for coupling a fractions reverse pulse generated in response to energization of said first predetermined indicating circuit to said fractions reverse gating means, the count in said units order counter being varied by said forward and reverse pulses, said units order counter generating a units forward pulse in response to said fractions forward pulses after reaching a first predetermined count, said units order counter generating a units reverse pulse in response to one of said fractions reverse pulses after reaching a second predetermined counter, and means for coupling said units forward and reverse pulses to said units forward and reverse gating means, respectively.

9. Apparatus as defined in claim 8 in which means are provided for selectively reading information out of said counters.

10. In apparatus for measuring shaft rotation, first means coupled to said shaft, said first means being moved along a closed path during each revolution of said shaft; a predetermined number of second means, pulse generating circuits and indicating circuits; said second means being spaced along the path, said first means cooperating with each of said second means when adjacent thereto for generating signals therein, each of said pulse generating circuits being coupled to an associated one of said second means and responsive to the signals therefrom for generating a pair of spaced pulses, a fractions order counter including said indicating circuits, each of said indicating circuits being coupled to an associated one of said pulse generating circuits, means responsive to the first of said pair of spaced pulses for clearing said indicating circuits in said fractions order counter, means responsive to the second of said pair of spaced pulses for energizing the indicating circuit coupled to the pulse generating circuit producing said second pulse, a plurality of further order counters connected in cascade relation to said fractions order counter, forward carry pulse generating means responsive to deenergization of the indicating circuit in the last stage of said fractions order counter for producing a forward carry pulse, reverse carry pulse generating means responsive to deenergization of the indicating circuit in the first stage of said fractions order counter for producing a reverse carry pulse, forward and reverse gating circuits associated with each of said further order counters, means responsive to said forward and reverse carry pulses for opening said forward and reverse gating circuits, respectively, means for coupling forward pulses generated in response to energization of the first stages in said order counters through said gating circuits when open to the immediately succeeding order counters, means for coupling reverse pulses generated in response to energization of the last stages in said order counters through said reverse gating means when open to the immediately succeeding order counters, and means for selectively reading the count out of said order counters.

11. Apparatus for measuring shaft rotation comprising a coil assembly coupled to said shaft, said assembly adapted to be energized by an alternating current source and provided with a permanent magnet core, said assembly being rotated along a closed path during each revolution of said shaft; a predetermined number of pick-up coils, self-restoring trigger circuits and indicating circuits; said pick-up coils being symmetrically spaced along the path, said coil assembly cooperating with each of said pick-up coils when adjacent thereto for generating signals there-in, each of said self-restoring trigger circuits being coupled to an associated one of said pick-up coils and responsive to the signals therefrom for generating a pair of spaced pulses, a fractions order counter including said indicating circuits, each of said indicating circuits being coupled to an associated one of said self-restoring trigger circuits, each of said indicating circuits including a trigger circuit with stable on and off conditions, means responsive to the first of said pair of spaced pulses for switching off any of said trigger circuits in the on condition, means responsive to the second of said pair of spaced pulses for turning on the trigger circuit in the indicator circuit coupled to the self-restoring trigger circuit producing said second pulse, a units order counter, forward means responsive to energization of a predetermined pair of said indicating circuits in a first sequence for applying a forward pulse to said units order counter, reverse means responsive to energization of said predetermined pair of said indicating circuits in a second sequence for applying a reverse pulse to said units order counter, said units order counter being responsive to said forward pulses for counting up and being responsive to said reverse pulses for counting down.

12. Apparatus as defined in claim 11 in which means are provided for selectively reading the count out of said counters.

13. Apparatus for measuring shaft rotation comprising a coil assembly coupled to said shaft, said assembly adapted to be energized by an alternating current source and provided with a permanent magnet core, said assembly being rotated along a closed path during each revolution of said shaft; a predetermined number of pick-up coils, self-restoring trigger circuits and indicating circuits; said pick-up coils being symmetrically spaced along the path, said coil assembly cooperating with each of said pick-up coils when adjacent thereto for generating signals therein, each of said self-restoring trigger circuits being coupled to an associated one of said pick-up coils and responsive to the signals therefrom for generating a pair of spaced pulses, a fractions order counter including said indicating circuits, each of said indicating circuits being coupled to an associated one of said self-restoring trigger circuits, each of said indicating circuits including a trigger circuit with stable on and off conditions, means responsive to the first of said pair of spaced pulses for switching off any of said trigger circuits in the on condition, means responsive to the second of said pair of spaced pulses for turning on the trigger circuit in the indicator coupled to the self-restoring trigger circuit producing said second pulse, a plurality of further order counters connected in cascade relation to said fractions order counter, forward carry pulse generating means responsive to the switching off of the trigger circuit in the last stage of said fractions order counter for producing a forward carry pulse, reverse carry pulse generating means responsive to the switching off of the trigger circuit in the first stage of said fractions order counter for producing a reverse carry pulse, forward and reverse gating circuits associated with each of said further order counters, means responsive to said forward and reverse carry pulses for opening said forward and reverse gating circuits, respectively, means for coupling forward pulses generated in response to the switching on of the trigger circuits in the first stages of said order counters through said gating circuits when open to the immediately succeeding order counters, means for coupling reverse pulses generated in response to the switching on of the trigger circuits in the last stages in said order counters through said reverse gating circuits when open to the immediately succeeding order counters, and means for selectively reading the count out of said order counters.

References Cited in the file of this patent

UNITED STATES PATENTS

| | | |
|---|---|---|
| 2,407,286 | Kinkead | Sept. 10, 1946 |
| 2,656,106 | Stabler | Oct. 20, 1953 |
| 2,680,241 | Gridley | June 1, 1954 |

OTHER REFERENCES

"A bidirectional electronic counter for use in optical interferometry," Branin, Journal of the Optical Society of America, vol. 43, Number 10, October 1953, pages 839–848.

"A magnetically coupled low-cost high speed shaft position digitizer," Winter, Proc. of the Western Comp. Conference, June 1953.